(12) United States Patent
Chia et al.

(10) Patent No.: US 12,707,202 B2
(45) Date of Patent: Aug. 11, 2026

(54) APPARATUS WITH SWIVEL SPEAKER PODS AND CAVITY AMPLIFIER

(71) Applicant: Honda Motor Co., Ltd., Tokyo (JP)

(72) Inventors: Geemay Megan Chia, Pasadena, CA (US); Christopher John Tarchala, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 179 days.

(21) Appl. No.: 18/886,867

(22) Filed: Sep. 16, 2024

(65) Prior Publication Data

US 2026/0082153 A1 Mar. 19, 2026

(51) Int. Cl.

*H04R 5/02* (2006.01)
*G06F 3/04847* (2022.01)
*G06F 3/16* (2006.01)
*H04R 1/02* (2006.01)

(52) U.S. Cl.

CPC .......... *H04R 5/02* (2013.01); *G06F 3/04847* (2013.01); *G06F 3/165* (2013.01); *H04R 1/025* (2013.01)

(58) Field of Classification Search

CPC .......... H04R 5/02; H04R 1/025; H04R 1/026; H04R 2499/13; H04R 2499/15; G06F 3/04847; G06F 3/165
USPC .......................................................... 381/302
See application file for complete search history.

(56) References Cited

U.S. PATENT DOCUMENTS 6,176,346 B1 1/2001 Wiener
6,744,898 B1 6/2004 Hirano
7,466,832 B2 12/2008 House
9,743,164 B2 8/2017 Mclean et al.
10,063,973 B2 8/2018 Mezzomo et al.
10,097,922 B2 10/2018 Fathollahi
10,750,263 B2 8/2020 Prommersberger et al.
11,052,801 B2 7/2021 Winton et al.
11,297,405 B1 4/2022 Iniguez
2023/0057510 A1* 2/2023 Park ...................... G06F 1/1652

FOREIGN PATENT DOCUMENTS

CN 108528353 A 9/2018
CN 210007842 U 1/2020
CN 216291406 U 4/2022
CN 114629977 A * 6/2022 ............ H04M 1/026
KR 100187929 B1 6/1999
KR 101230898 B1 2/2013
WO 2022147325 A1 7/2022
WO 2022147346 A1 7/2022
WO 2022257119 A1 12/2022

* cited by examiner

*Primary Examiner* — David L Ton

(74) *Attorney, Agent, or Firm* — Suzanne Gagnon; American Honda Motor Co., Inc.

(57) ABSTRACT

An apparatus with swivel speaker pods includes a first audio reproduction device having a first interior surface, a second audio reproduction device having a second interior surface, and an attaching component included in at least one of the first audio reproduction device or the second audio reproduction device. The attaching component is configured to removably attach the first interior surface with the second interior surface. The attaching component is located at an attaching portion of at least one of the first audio reproduction device or the second audio reproduction device such that a swivel joint is formed between the first interior surface and the second interior surface.

20 Claims, 10 Drawing Sheets

200A
202
102A
110
106
102

200C
102B
206
112
106
102

204
102A
110
106
102
200B 208
102B
112
106
102
200D 400
402A
402B
402C
402D
102
102B
104
104A
106
110
112
404
406
408
A
C
L

600B

T1

T2

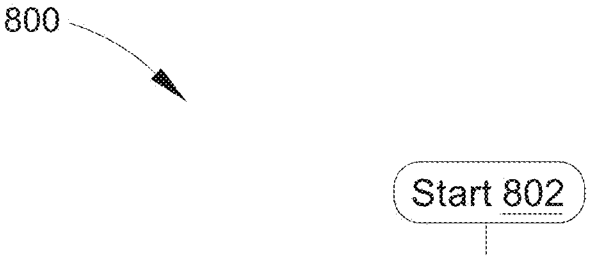

Start 802

Locating attaching component at attaching portion of at least one of first audio reproduction device or second audio reproduction device, such that swivel joint is formed between first interior surface of first audio reproduction device and second interior surface of second audio reproduction device 804

Removably attaching second interior surface of second audio reproduction device with first interior surface of first audio reproduction device, in closed state, via attaching component 806

Applying force on first or second audio reproduction device causing first interior surface to swivel apart from second interior surface about swivel joint 808

Securing at least one of first audio reproduction device or second audio reproduction device to support structure, such that first interior surface or second interior surface is detachably coupled to surface of support structure, where first audio reproduction device or second audio reproduction device, in operational state, generates audio that is amplified due to cavity in support structure 810

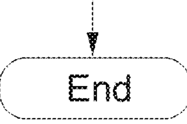

FIG. 8

APPARATUS WITH SWIVEL SPEAKER PODS AND CAVITY AMPLIFIER

BACKGROUND

The use of modern portable speakers is expanding in both indoor and outdoor contexts, such as boating, fishing, biking, off-road driving, hiking, camping, and other unconventional and potentially weather and water-prone locations. These speakers are typically wireless, battery-operated, and adaptable enough to function in challenging, dusty, or wet conditions. However, the design and dimensions of the portable speakers often limit the available mounting options and can hinder the amplification of surround sound. Therefore, there is a need for a simplified design for portable speakers that allows for improved mounting options and enhanced surround sound amplification.

Limitations and disadvantages of conventional and traditional approaches will become apparent to one of skill in the art, through comparison of described systems with few aspects of the present disclosure, as set forth in the remainder of the present application and with reference to the drawings.

SUMMARY

According to an embodiment of the disclosure, an apparatus may include a first audio reproduction device having a first interior surface, and a second audio reproduction device having a second interior surface that may be configured to removably attach with the first interior surface via an attaching component. The attaching component may be located at an attaching portion of at least one of the first audio reproduction device or the second audio reproduction device such that a swivel joint is formed between the first interior surface and the second interior surface.

According to another embodiment of the disclosure, a method of assembly may include locating an attaching component at a attaching portion of at least one of a first audio reproduction device or a second audio reproduction device, such that a swivel joint is formed between a first interior surface of the first audio reproduction device and a second interior surface of the second audio reproduction device. The method may further include removably attaching the second interior surface of the second audio reproduction device with the first interior surface of the first audio reproduction device via the attaching component. The method may further include applying a force on the first audio reproduction device or the second audio reproduction device that may cause the first interior surface to swivel apart from the second interior surface about the swivel joint. The method may further include securing at least one of the first audio reproduction device or the second audio reproduction device to a support structure such that the first interior surface or the second interior surface is detachably coupled to a surface of the support structure. Further, the first audio reproduction device or the second audio reproduction device, in an operational state, may generate audio that may be amplified due to a cavity in the support structure.

BRIEF DESCRIPTION OF THE DRAWINGS

FIG. 8 is a flowchart that illustrates an exemplary method of assembly of an apparatus, in accordance with an embodiment of the disclosure.

Figure 1A:
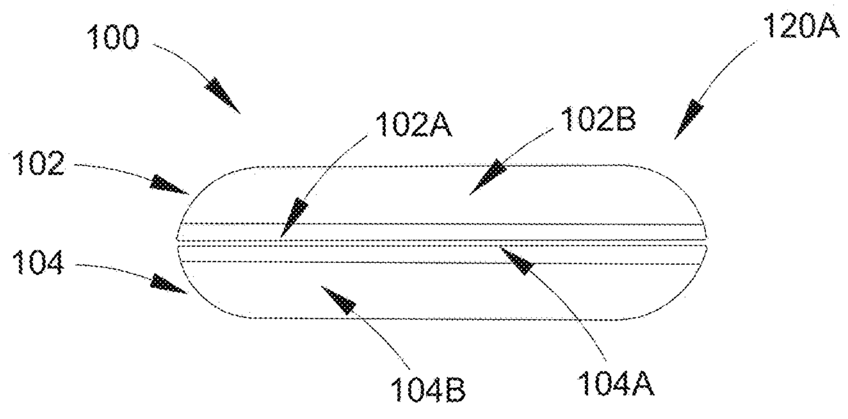
FIG. 1A is a side view of an apparatus including a first audio reproduction device and a second audio reproduction device, in a closed state, in accordance with an embodiment of the disclosure.

The foregoing summary, as well as the following detailed description of the present disclosure, is better understood when read in conjunction with the appended drawings. To illustrate the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

Various embodiments of the present disclosure may be found in an apparatus. The disclosed apparatus may include a first audio reproduction device having a first interior surface, a second audio reproduction device having a second interior surface, and an attaching component that may be configured to removable attach the first interior surface with the second interior surface. Further, the attaching component may be included in at least one of the first audio reproduction device or the second audio reproduction device. Moreover, the attaching component may be located at an attaching portion of at least one of the first audio reproduction device or the second audio reproduction device such that a swivel joint may be formed between the first interior surface and the second interior surface.

Traditionally, mounting portable speakers either inside or outside of the vehicle may cause a number of issues. For example, if the portable speakers are installed either inside or outside of the vehicle, the vehicle may require mounting structures. However, in many instances, such mounting structures are limited to design and dimensions of the portable speakers, resulting in increased cost and development of a plurality of mounting structures for different speakers and vehicles. Moreover, a single unit portable speaker with intricate designs may be difficult to mount and may reduce amplification of surround sound.

To overcome some of the abovementioned issues, the proposed portable speaker may include a first audio reproduction device and a second audio reproduction device that may be magnetically attached or snapped together, swiveled apart, and detached to be completely separated from each other. The proposed portable speaker may include the first audio reproduction device and the second audio reproduction device that may be mounted on a surface having a cavity and may amplify the sound generated from the proposed portable speaker. Thereafter, the proposed portable speaker does not require additional mounting structures.

Reference will now be made in detail to specific aspects or features, examples of which are illustrated in the accompanying drawings. Wherever possible, corresponding, or similar reference numbers will be used throughout the drawings to refer to the same or corresponding parts.

FIG. 1A illustrates a side view of an apparatus, in a closed state, in accordance with an exemplary embodiment of the disclosure. As shown in FIG. 1A, an apparatus 100 includes a first audio reproduction device 102 and a second audio reproduction device 104. The first audio reproduction device 102 includes a first interior surface 102A and a first exterior surface 102B that is opposite to the first interior surface 102A. The second audio reproduction device 104 includes a second interior surface 104A and a second exterior surface 104B that is opposite to the second interior surface 104A. The first and second audio reproduction devices 102, 104 may be, for example, portable speaker pods that may include a plurality of functional components, such as a processor, an antenna, a magnet, a suspension, or a grill.

Figure 1B:
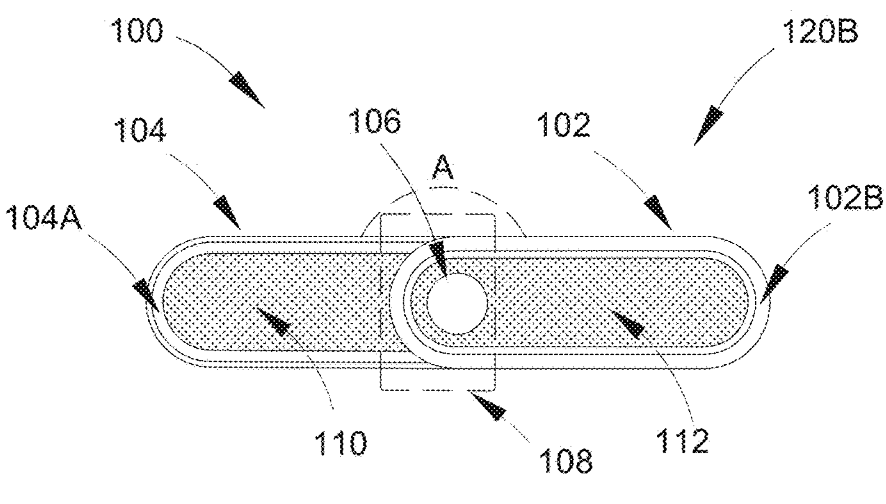
FIG. 1B is a top view of the apparatus of FIG. 1A, in a swiveled state, in accordance with an embodiment of the disclosure.
Figure 1C:
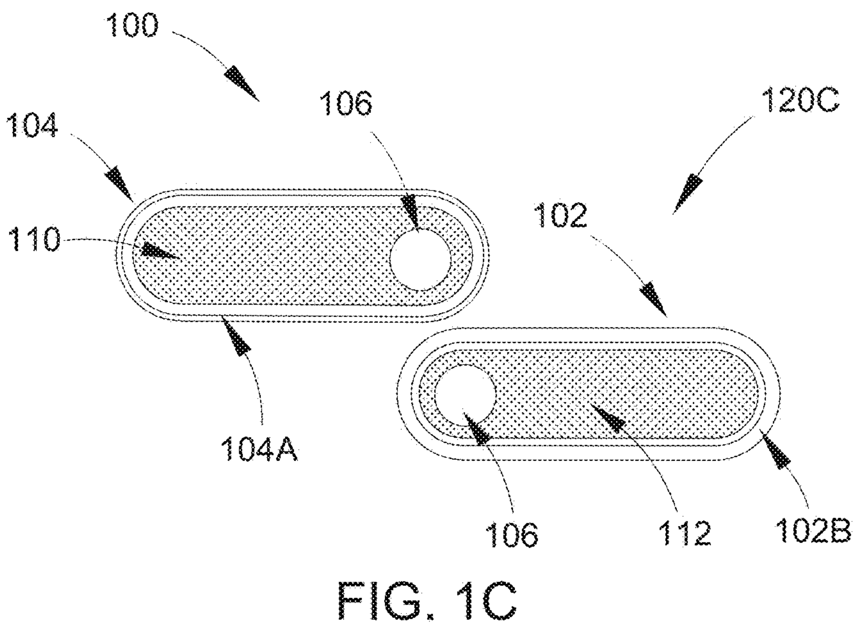
FIG. 1C illustrates a top view of the apparatus of FIG. 1A, in a detached state, in accordance with an embodiment of the disclosure.

FIG. 1B illustrates a top view of the apparatus of FIG. 1A, in a swiveled state, in accordance with an embodiment of the disclosure. As shown in FIG. 1B, the apparatus 100 also includes an attaching component 106, which is located at an attaching portion 108, a primary sound originating region 110 that may produce audio, and a secondary sound originating region 112 that may produce audio. FIG. 1C illustrates a top view of the apparatus of FIG. 1A, in a detached state, in accordance with an embodiment of the disclosure.

In one aspect, the apparatus 100 may be in a closed state 120A, when the first audio reproduction device 102 and the second audio reproduction device 104 are attached or snapped together as illustrated, for example, in FIG. 1A. In another aspect, the apparatus 100 may be in a swiveled state 120B, when the first audio reproduction device 102 is swiveled apart from the second audio reproduction device 104 at a particular swivel angel (such as an angle "A") as illustrated, for example, in FIG. 1B. In a further aspect, the apparatus 100 may be in a detached state 120C, when the first audio reproduction device 102 is detached from the second audio reproduction device 104 as illustrated, for example, in FIG. 1C. In some embodiments, the apparatus 100 may be inactive (or powered off) in the closed state 120A and may be turned on in the swiveled state 120B or a detached state 120C. In other embodiments, the apparatus may be active in the closed state 120A, the swiveled state 120B, and the detached state 120C. In accordance with an embodiment, the apparatus 100 may be mounted on side walls, a ceiling, a floor of a room, or a surface of a support structure of a vehicle, etc. In accordance with another embodiment, the apparatus 100 may be placed on a surface of an object placed in an ambient environment (e.g., a room in a building, a patio, or a campsite). In accordance with another embodiment, the apparatus 100 may be mounted on a wearable item (e.g., backpacks, clothes, and the like) of a user.

The apparatus 100 may include suitable logic, circuitry, and/or interfaces that may be configured to receive audio content from a computing device and control playback of the received audio content. Examples of the apparatus 100 may include, but are not limited to, a wearable audio device or a head-mounted audio device, a loudspeaker, a woofer, a sub-woofer, a tweeter, a wireless speaker, a monitor speaker or other speakers, or a wireless speaker of a surround sound system. The apparatus 100 may rely on a wireless communication protocol, such as Wi-Fi®, Bluetooth® or Bluetooth Low Energy (BLE®) to receive the audio content. The apparatus 100 may be communicatively coupled with one or more electronic device such as tablets, smartphones, personal computing devices, vehicle's sound system, or other electronic devices. The present disclosure may be applicable to other types of apparatus (for example, a loudspeaker, a woofer, a sub-woofer, a tweeter, a wireless speaker, a monitor speaker, or other speakers, and the like). The description of such types of apparatus has been omitted from the disclosure for the sake of brevity.

Each of the first audio reproduction device 102 and the second audio reproduction device 104 may include suitable logic, circuitry, and interfaces that may be configured to receive electrical audio signals from a processor/circuitry and convert the received electrical audio signals into the audio/sound output. In some embodiments, the first audio reproduction device 102 and/or the second audio reproduction device 104 may be integrated with the apparatus 100 and may be an internal component of the apparatus 100. Examples of the first audio reproduction device 102 and the second audio reproduction device 104 may include, but are not limited to, a loudspeaker, a woofer, a sub-woofer, a tweeter, a wireless speaker, a monitor speaker, or other speakers or sound output device.

The first audio reproduction device 102 may have a substantially rectangular shape with rounded corners. Alternatively, the first audio reproduction device 102 may be formed to have another shape (e.g., a substantially square shape, circular shape, semi-circular shape, and the like), without a departure from the scope of the present disclosure. The first audio reproduction device 102 may be mounted on a surface of a wall, a ceiling, or a floor of an enclosure, or a surface (for example, surface 406) of a vehicle, as described in detail, for example in FIG. 4A. and FIG. 4B. The first interior surface 102A may be a flat or planar surface and may have a substantially rectangular shape with rounded corners. Alternatively, the first interior surface 102A may be formed to have another shape (e.g., a substantially square shape, circular shape, semi-circular shape, and the like), without a departure from the scope of the present disclosure. The first exterior surface 102B may be a curved or three-dimensional rounded surface and may have a substantially hemispherical shape with rounded corners. Alternatively, the first interior surface 102A may be formed to have another shape (e.g., a substantially square shape, circular shape, semi-circular shape, and the like), without a departure from the scope of the present disclosure. The second audio reproduction device 104, the second interior surface 104A, and the second exterior surface 104B may have a similar shape as the first audio reproduction device 102, first interior surface 102A, and the first exterior surface 102B, respectively. For example, the second interior surface 104A may be identical to the first exterior surface 102A, and the second exterior surface 104B may be identical to the first exterior surface 102B. Therefore, the description of the shape of the second audio reproduction device 104, the second interior surface 104A, and the second exterior surface 104B is omitted from the disclosure for the sake of brevity.

In some embodiments, the functions of the second audio reproduction device 104 may be the same as that of the first audio reproduction device 102. For example, the second audio reproduction device 104 and the first audio reproduction device 102 may function as at least one of a speaker, amplifier, stereo receiver, or sub-woofer. Alternatively, the functions of the second audio reproduction device 104 may be different from the functions of the first audio reproduction device 102. For example, the second audio reproduction device 104 may function as a sub-woofer and the first audio reproduction device 102 may function as a speaker. As another example, the second audio reproduction device 104 may function as an amplifier and the first audio reproduction device 102 may function as a sub-woofer.

In other embodiments, the functions of the second audio reproduction device 104 may supplement the functions of the first audio reproduction device 102. For example, a low frequency audio of the second audio reproduction device 104 may be supplemented by a high frequency audio of the first audio reproduction device 102. As another example, a low volume of the second audio reproduction device 104 may be supplemented by a high volume of the first audio reproduction device 102. As another example, a high frequency audio of the second audio reproduction device 104 may be supplemented by a low frequency of the first audio reproduction device 102. As another example, a high volume of the second audio reproduction device 104 may be supplemented by a low volume of the first audio reproduction device 102.

In one embodiment, the structure of the second audio reproduction device 104 may be same as that of the first audio reproduction device 102. As an example, a length of the second audio reproduction device 104 may be same as a length of the first audio reproduction device 102. Additionally, a width of the second audio reproduction device 104 may be same as a width of the first audio reproduction device 102. In another embodiment, the structure of the second audio reproduction device 104 may be different from that of the first audio reproduction device 102. As an example, a length of the second audio reproduction device 104 may be greater than a length of the first audio reproduction device 102. Alternatively, the length of the second audio reproduction device 104 may be smaller than the length of the first audio reproduction device 102. Additionally, a width of the second audio reproduction device 104 may be greater than a width of the first audio reproduction device 102. As another example, the width of the second audio reproduction device 104 may be smaller than the width of the first audio reproduction device 102.

In accordance with an embodiment, each of the first audio reproduction device 102 and the second audio reproduction device 104 may be wirelessly connected to each other. Additionally, or alternatively, each of the first audio reproduction device 102 and the second audio reproduction device 104 may be wirelessly connected to a vehicle, media device, or other electronic device via a wireless network (such as a Bluetooth®, a Wi-Fi® network, or a C-V2X network).

The primary sound originating region 110 may produce audio and may be a part of at least one of the first audio reproduction device 102 and the second audio reproduction device 104. Similarly, the secondary sound originating region 112 may produce audio and may be a part of at least one of the first audio reproduction device 102 and the second audio reproduction device 104. Each of the primary sound originating region 110 and the secondary sound originating region 112 may be configured to convert an electrical signal into sound waves. For example, sound waves are produced when the apparatus 100 receives an audio signal that vibrates the primary sound originating region 110 or the secondary sound originating region 112. In an exemplary embodiment, the primary sound originating region 110 may generate audio that depends on a material used for construction of the primary sound originating region 110 or a dimension of the primary sound originating region 110. As an example, the primary sound originating region 110 having a larger dimension and made from a rigid material may generate audio with less distortion than one having a smaller dimension and made from a flexible material. Additionally, or alternatively, the primary sound originating region 110 may correspond to a grill of the apparatus 100. The secondary sound originating region 112 may be identical with the primary sound originating region 110 in terms of functionality. Therefore, further description of the secondary sound originating region 112 is omitted from the disclosure for the sake of brevity.

Each of the first interior surface 102A and the second interior surface 104A may include the primary sound originating region 110. For example, the primary sound originating region 110 may be located in a partial region or an entire region of at least one of the first interior surface 102A or the second interior surface 104A, as described in detail, for example, in FIG. 2A and FIG. 2B. Each of the first exterior surface 102B and the second exterior surface 104B may include the secondary sound originating region 112. For example, the secondary sound originating region 112 may be located in a partial region or an entire region of at least one of the first exterior surface 102B and the second exterior surface 104B, as described in detail, for example, in FIG. 2C and FIG. 2D.

Figure 2A:
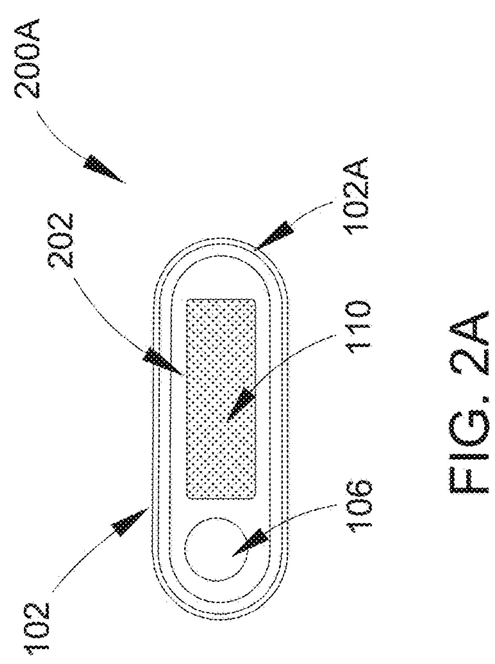
FIG. 2A is a scenario diagram that illustrates a sound originating region as a partial region of an interior surface of an audio reproduction device of the apparatus of FIG. 1A, in accordance with an embodiment of the disclosure.
Figure 2C:
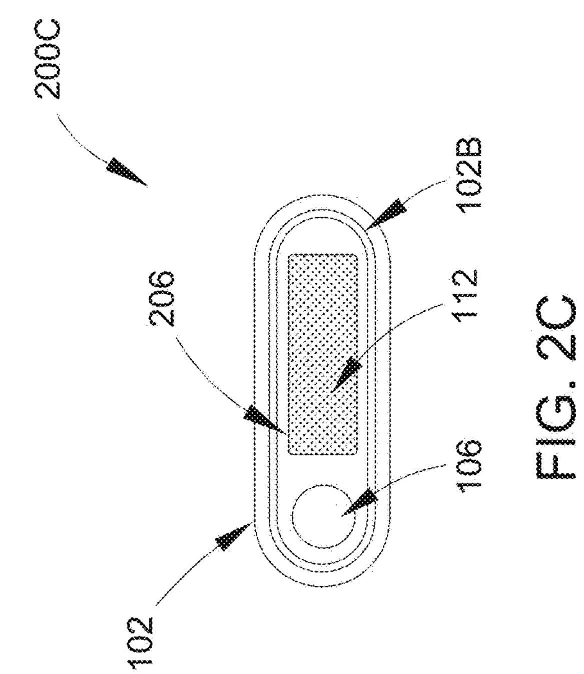
FIG. 2C is another scenario diagram that illustrates the sound originating region as a partial region of an exterior surface of the audio reproduction device of the apparatus of FIG. 1A, in accordance with an embodiment of the disclosure.
Figure 2B:
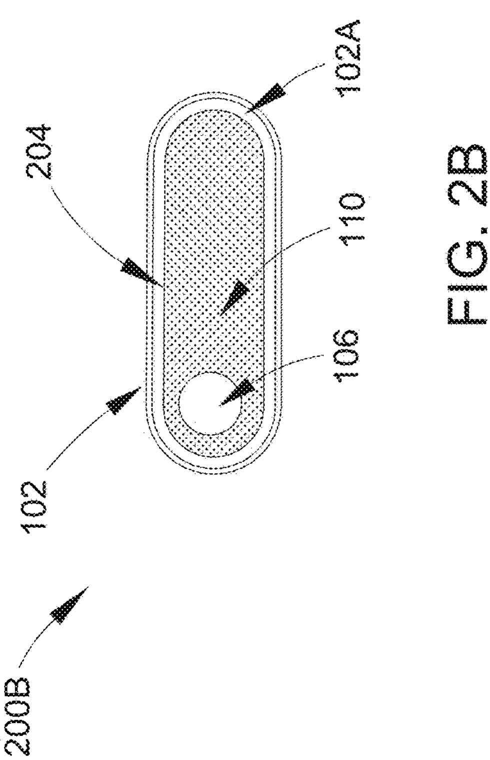
FIG. 2B is another scenario diagram that illustrates the sound originating region as an entire region of the interior surface as shown in FIG. 2A, in accordance with an embodiment of the disclosure.

As shown in FIG. 2A and FIG. 2B, the primary sound originating region 110 may be located in a partial region or an entire region of an interior surface of an audio reproduction device of the apparatus of FIG. 1A. With reference to FIG. 2A, a scenario diagram 200A illustrates that the primary sound originating region 110 may be located in a partial region 202 of the first interior surface 102A of the first audio reproduction device 102. The partial region 202 may have, for example, a substantially rectangular shape or may be formed to have another shape (e.g., a substantially square shape, circular shape, semi-circular shape, and the like) without a departure from the scope of the present disclosure. With reference to FIG. 2B, a scenario diagram 200B illustrates that the primary sound originating region 110 may be located in an entire region 204 of the first interior surface 102A of the first audio reproduction device 102. The entire region 204 may have, for example, a substantially rectangular shape with rounded corners or may be formed to have another shape without a departure from the scope of the present disclosure. The second interior surface 104A may be identical to the first interior surface 102A. Therefore, the description of the primary sound originating region 110 located on a partial region or entire region of the second interior surface 104A is omitted from the disclosure for the sake of brevity. It should be noted that the scenario diagram 200A as shown in FIG. 2A and the scenario diagram 200B as shown in FIG. 2B are for exemplary purposes and should not be construed to limit the scope of the disclosure.

Figure 2D:
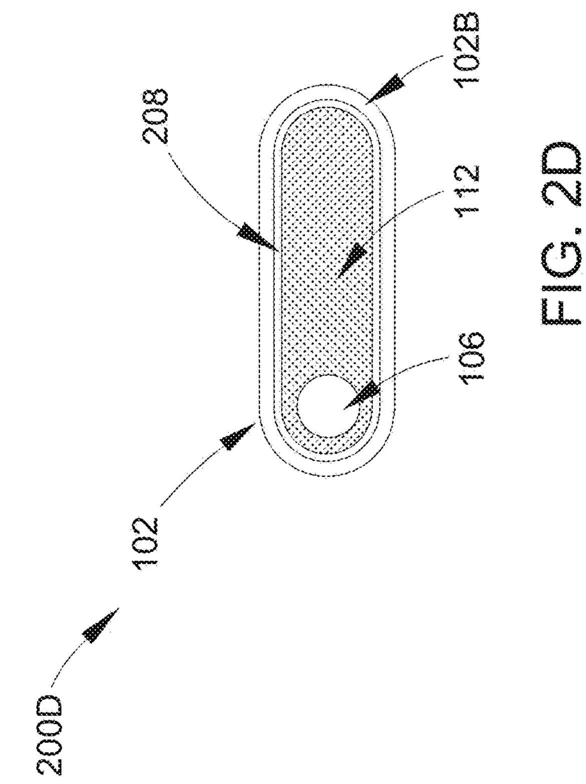
FIG. 2D is another scenario diagram that illustrates the sound originating region as an entire region of the exterior surface as shown in FIG. 2C, in accordance with an embodiment of the disclosure.

As shown in FIG. 2C and FIG. 2D, the secondary sound originating region 112 may be located in a partial region or an entire region of an exterior surface of an audio reproduction device of the apparatus of FIG. 1A. With reference to FIG. 2C, a scenario diagram 200C illustrates that the primary sound originating region 112 may be located in a partial region 206 of the first exterior surface 102B. The partial region 206 may have, for example, a substantially rectangular or may be formed to have another shape without a departure from the scope of the present disclosure. With reference to the FIG. 2D, a scenario diagram 200D illustrates that the secondary sound originating region 112 may be located in an entire region 208 of the first exterior surface 102B of the first audio reproduction device 102. The entire region 208 may have substantially rectangular shape with rounded corners or may be formed to have another shape without a departure from the scope of the present disclosure. The second exterior surface 104B may be identical to the first exterior surface 102B. Therefore, the description of the secondary sound originating region 112 located on a partial region or entire region of the second exterior surface 104B is omitted from the disclosure for the sake of brevity. It should be noted that the scenario diagram 200C as shown in FIG. 2C and the scenario diagram 200D as shown in FIG. 2D are for exemplary purposes and should not be construed to limit the scope of the disclosure.

The attaching component 106 may be included in at least one of the first audio reproduction device 102 or the second audio reproduction device 104. The attaching component 106 may be configured to attach and firmly secure the first audio reproduction device 102 to the second audio reproduction device 104 and to detach and separate the first audio reproduction device 102 from the second audio reproduction device 104. For example, the attaching component 106 may be a metal object that exhibits a strong attraction to another metal object, such as a magnet or an electromagnetic magnet. In an exemplary embodiment, the attaching component 106 may be configured to retain the first interior surface 102A of the first audio reproduction device 102 with the second interior surface 104A of the second audio reproduction device 104. The attaching component 106 may also be configured to flush the first interior surface 102A in a direct contact with the second interior surface 104A. As an example, when the apparatus is in the closed state 120A, the attaching component 106 may be configured to retain the first interior surface 102A with the second interior surface 104A, such that the first interior surface 102A is flushed with the second interior surface 104A. As another example, when the apparatus is in the swiveled state 120B, the attaching component 106 may be configured to retain the first interior surface 102A with the second interior surface 104A, such that the first interior surface 102A is parallel to the second flat surface 104A and placed at an angle A to the second interior surface 104A. As another example, when the apparatus is in the detached state 120C, the attaching component 106 may be configured to detach the first interior surface 102A from the second interior surface 104A, such that the first interior surface 102A is completely separated from the second interior surface 104A. The attaching component 106 may be located at the attaching portion 108 of at least one of the first audio reproduction device 102 or the second audio reproduction device 104.

Figure 3:
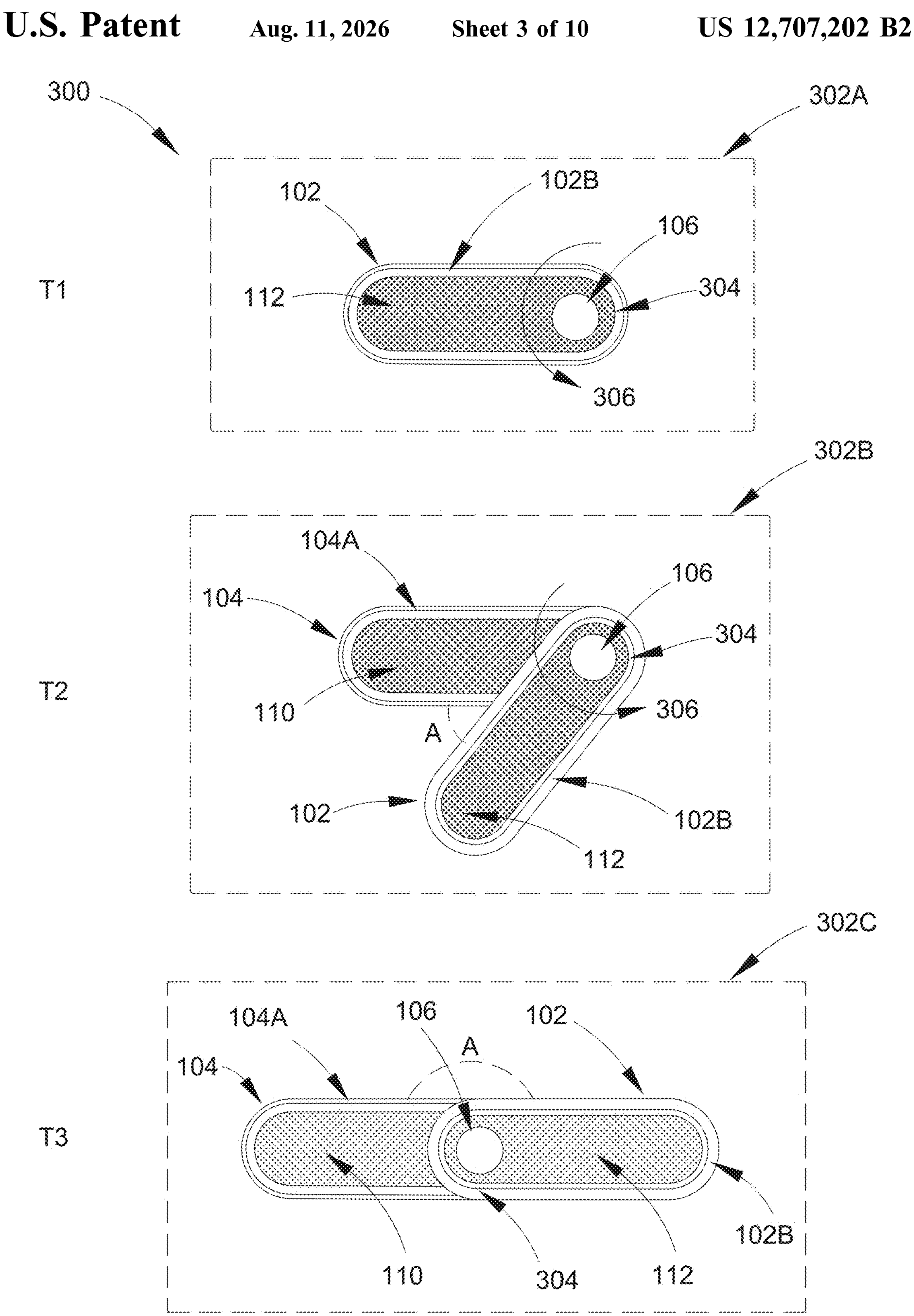
FIG. 3 is an exemplary diagram that illustrates a two-part structure and different orientations of the first audio reproduction device and the second audio reproduction device of the apparatus of FIG. 1A, in accordance with an embodiment of the disclosure.

The attaching portion 108 may be located on each of the first audio reproduction device 102 and the second audio reproduction device 104. In an exemplary embodiment, the attaching portion 108 may be an end portion, which is located at an end segment of each of the first audio reproduction device 102 and the second audio reproduction device 104. In other embodiments, the attaching portion 108 may be a center portion or a middle portion of each of the first audio reproduction device 102 and the second audio reproduction device 104. The attaching component 106 may be located at the attaching portion 108 such that a swivel joint (for example, a swivel joint 304 as shown in FIG. 3) is formed between the first interior surface 102A and the second interior surface 104A. The swivel joint may be configured to allow each of the first audio reproduction device 102 and the second audio reproduction device 104 to move or rotate against each other. The first audio reproduction device 102 may be placed at different orientations with respect to the second audio reproduction device 104, as described in detail, for example, in FIGS. 3 and 4.

FIG. 3 is an exemplary diagram that illustrates a two-part structure and different orientations of the first audio reproduction device and the second audio reproduction device of the apparatus of FIG. 1A in accordance with an embodiment of the disclosure. With reference to FIG. 3, an exemplary diagram 300 illustrates an initial orientation 302A at a time instant $T_1$, an intermediate orientation 302B at a time instant $T_2$, and a final orientation 302C at time instant $T_3$. It should be further noted that the exemplary diagram 300 of FIG. 3 is for exemplary purposes and should not be construed to limit the scope of the disclosure.

In the initial orientation 302A, the apparatus 100 may be in the closed or snapped state 120A. For example, the first audio reproduction device 102 and the second audio reproduction device 104 may be magnetically attached or snapped together. The first audio reproduction device 102 and the second audio reproduction device 104 may be flushed together in the initial orientation 202A, and the secondary sound originating 112 may be completely exposed to the environment. In an embodiment, the first interior surface 102A of the first audio reproduction device 102 may overlap the second interior surface 104A of the second audio reproduction device 104 concealing the primary sound originating region 110, which may obstruct audio generated from the primary sound originating region 110. A swivel joint 304 may be formed between the first interior surface 102A and the second interior surface 104A due to the connecting component 106. The swivel joint 304 may be configured to allow each of the first audio reproduction device 102 and the second audio reproduction device 104 to move or rotate against each other. An application of a force 306 on the first exterior surface 102B or second exterior surface 104B may cause the first interior surface 102A to move or swivel apart from the second interior surface 104A about the swivel joint 304.

In the intermediate orientation 302B, the apparatus 100 may be in an intermediate swiveled state. For example, the first audio reproduction device 102 and the second audio reproduction device 104 may be swiveled apart and placed at an angle A to each other, partially exposing the primary sound originating region 110. For example, the application of the force 306 on the first exterior surface 102B or the second exterior surface 104B may cause the first interior surface 102A to swivel apart from the second interior surface 104A about the swivel joint 304, such that the first interior surface 102A is parallel to the second interior surface 104A and placed at an angle A to the second interior surface 104A. In an embodiment, the first audio reproduction device 102 and the second audio reproduction device 104 are placed at an acute angle or right angle to each other, and each of the primary sound originating region 110 and interior surfaces of the first audio reproduction device 102 and second audio reproduction device 104 may be partially exposed to an open space. Further application of the force 306 may provide further rotation about the swivel joint 304 to each of the first audio reproduction device 102 and the second audio reproduction device 104.

In the final orientation 202C, the apparatus 100 may be in a maximized swiveled state, in which the first audio reproduction device 102 and the second audio reproduction device 104 are further swiveled apart and placed at a larger angle A to each other to maximize the exposure of the primary sound originating region 110. In an embodiment, the first audio reproduction device 102 and the second audio reproduction device 104 may be placed at an obtuse angle or straight angle (such as an angle of about 180 degree) to each other, and each of the primary sound originating region 110 and the interior surfaces of the first audio reproduction device 102 and second audio reproduction device 104 may be maximally exposed to the open space.

Figure 4:
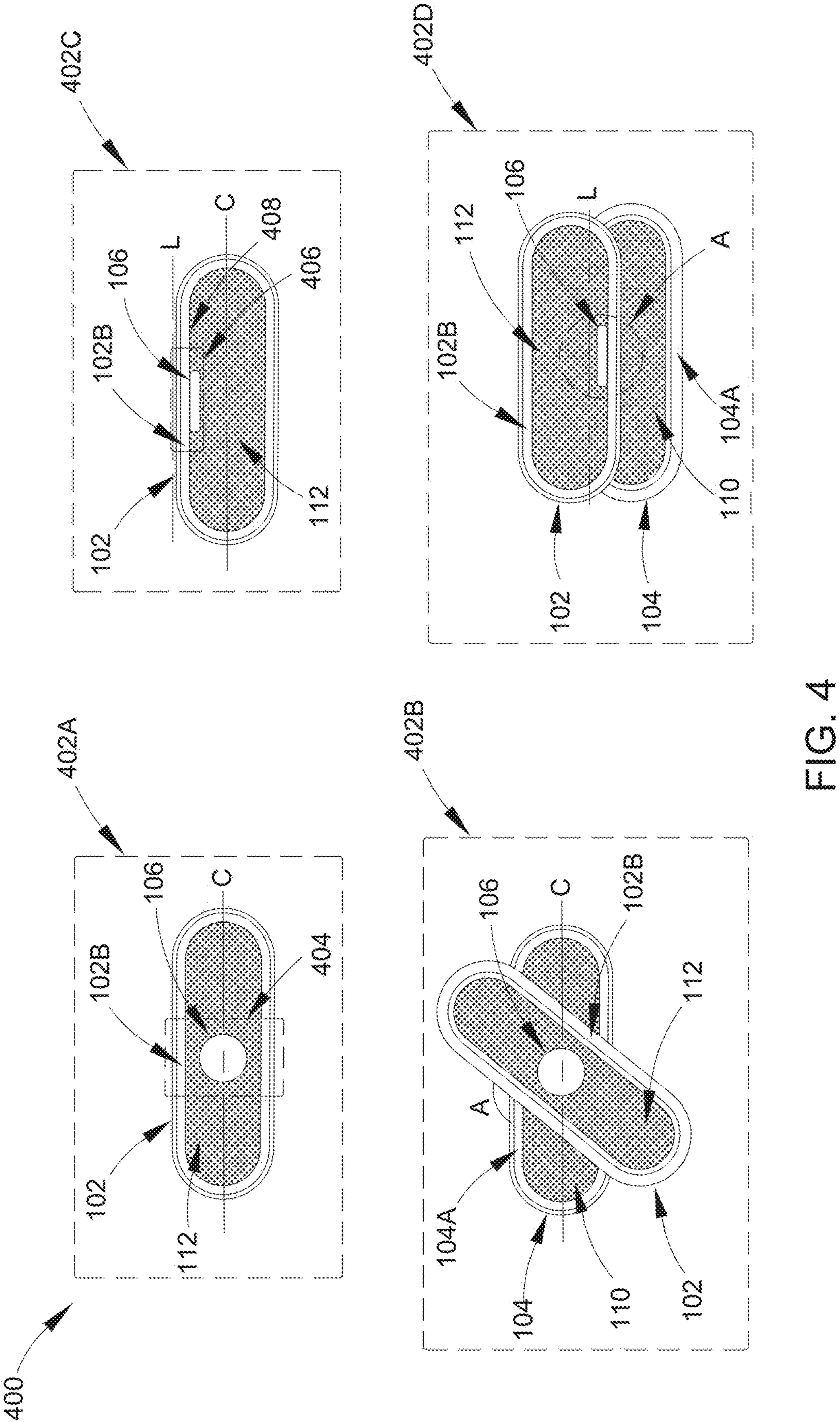
FIG. 4 is a scenario diagram that illustrates an attaching component located at a center portion and a middle portion of the apparatus as shown in FIG. 1A, in accordance with other embodiments of the disclosure.

FIG. 4 is a scenario diagram that illustrates the attaching component 106 located at a center portion and a middle portion of the apparatus 100 as shown in FIG. 1A, in accordance with other embodiments of the disclosure. With reference to the FIG. 4, a scenario diagram 400 illustrates a first scenario 402A, a second scenario 402B, a third scenario 402C, a fourth scenario 402D, a center portion 404, and a middle portion 406. The scenario diagram 700 further illustrates a central axis "C" and a length "L." It should be noted that the scenario diagram 400 as shown in FIG. 4 is for exemplary purposes and should not be construed to limit the scope of the disclosure.

In first scenario 402A, the attaching component 106 may be located at the center portion 404 of at least one of the first audio reproduction device 102 or the second audio reproduction device 104. In an embodiment, the center portion 404 may be located along a central axis C of each of the first audio reproduction device 102 and the second audio reproduction device 104. By way of example, and not limitation, the central axis may be along the length L of the first audio reproduction device 102 or the second audio reproduction device 104. In second scenario 402B, the attaching component 106 may be configured to retain the first audio reproduction device 102 with the second audio reproduction device 104, such that the first interior surface 102A is parallel to the second interior surface 104A and placed at an angle A (such as an acute angle or right angle) with each other, as described in detail, for example, in FIG. 3.

In third scenario 402C, the middle portion 406 may be located on an edge segment 408 of each of the first audio reproduction device 102 and the second audio reproduction device 104. The middle portion 406 may be along the length L of the first audio reproduction device 102 or the second audio reproduction device 104. The length L may be substantially parallel to the central axis C. In fourth scenario 402D, the attaching component 106 may be configured to retain the first audio reproduction device 102 with the second audio reproduction device 104, such that the first interior surface 102A is parallel to the second interior surface 104A and placed at an angle A (such as a reflex angle or complete angle of 360 degrees) with each other, as described in detail, for example, in FIG. 3.

Referring back to FIG. 1A, in the closed state 120A, the first audio reproduction device 102 and the second audio reproduction device 104 may be magnetically attached or snapped together. Further, the first interior surface 102A of the first audio reproduction device 102 may face the second interior surface 104A of the second audio reproduction device 104 such that the first interior surface 102A is flushed with the second interior surface 104A. In the closed state 120A, the first interior surface 102A may overlap the second interior surface 104A, which may obstruct audio generated from the primary sound originating region 110, and the first exterior surface 102B and the second exterior surface 104B may be exposed to the environment, and the secondary sound originating region 112 may be exposed to the environment. In the closed state 120A, the contact area between the first interior surface 102A and the second interior surface 104A may be greater than a surface area of other flat or substantially flat surface of the first audio reproduction device 102 or the second audio reproduction device 104. As an example, the contact area between the first interior surface 102A and the second interior surface 104A may be greater than a surface area of the first interior surface 102A and the second exterior surface 104B. In accordance with an embodiment, the apparatus 100 may be mounted or attached on an item when in the closed state 120A. For example, the first audio reproduction device 102 and the second audio reproduction device 104 may be placed on each side of a wearable item (e.g., backpacks, clothes, and the like) when in the closed state 120A, such that the apparatus 100 is attached to the item. In accordance with another embodiment, the apparatus 100 may be placed on a surface of an object placed in an ambient environment (e.g., a room in a building, a patio, or a campsite) when in the closed state 120A. Further details related to an implementation of the apparatus 100 in the closed state 120A, is described, for example, in FIG. 5B.

Referring back to FIG. 1C, in the detached state 120C, the first audio reproduction device 102 and the second audio reproduction device 104 may be detached and separated from each other. For example, the first audio reproduction device 102 and the second audio reproduction device 104 may be magnetically detached or unsnapped from each other, such as by pulling apart the first audio reproduction device 102 and the second audio reproduction device 104 with an amount of force sufficient to overcome the magnetic attraction or attachment. In the detached state 120C, the first audio reproduction device 102 may be separated from the second audio reproduction device 104, and each of the first interior surface 102A, the second interior surface 104A, the first exterior surface 102B, and the second exterior surface 104B may be exposed to an open space or environment (e.g., a passenger compartment of a vehicle, a room in a building, or a camping site). Further, in the detached state 120C, each of the primary sound originating region 110 and the secondary sound originating region 112 that generate audio may be exposed to the environment. In accordance with an embodiment, each of the first audio reproduction device 102 and the second audio reproduction device 104 may be placed or mounted against a surface, such as a wall, ceiling, furniture, or vehicle, a floor of an enclosure, or a support structure of a vehicle when in the closed state 120A. Further details related to an implementation of the apparatus 100 in the closed state 120A, is described, for example in FIG. 5A.

Figure 5A:
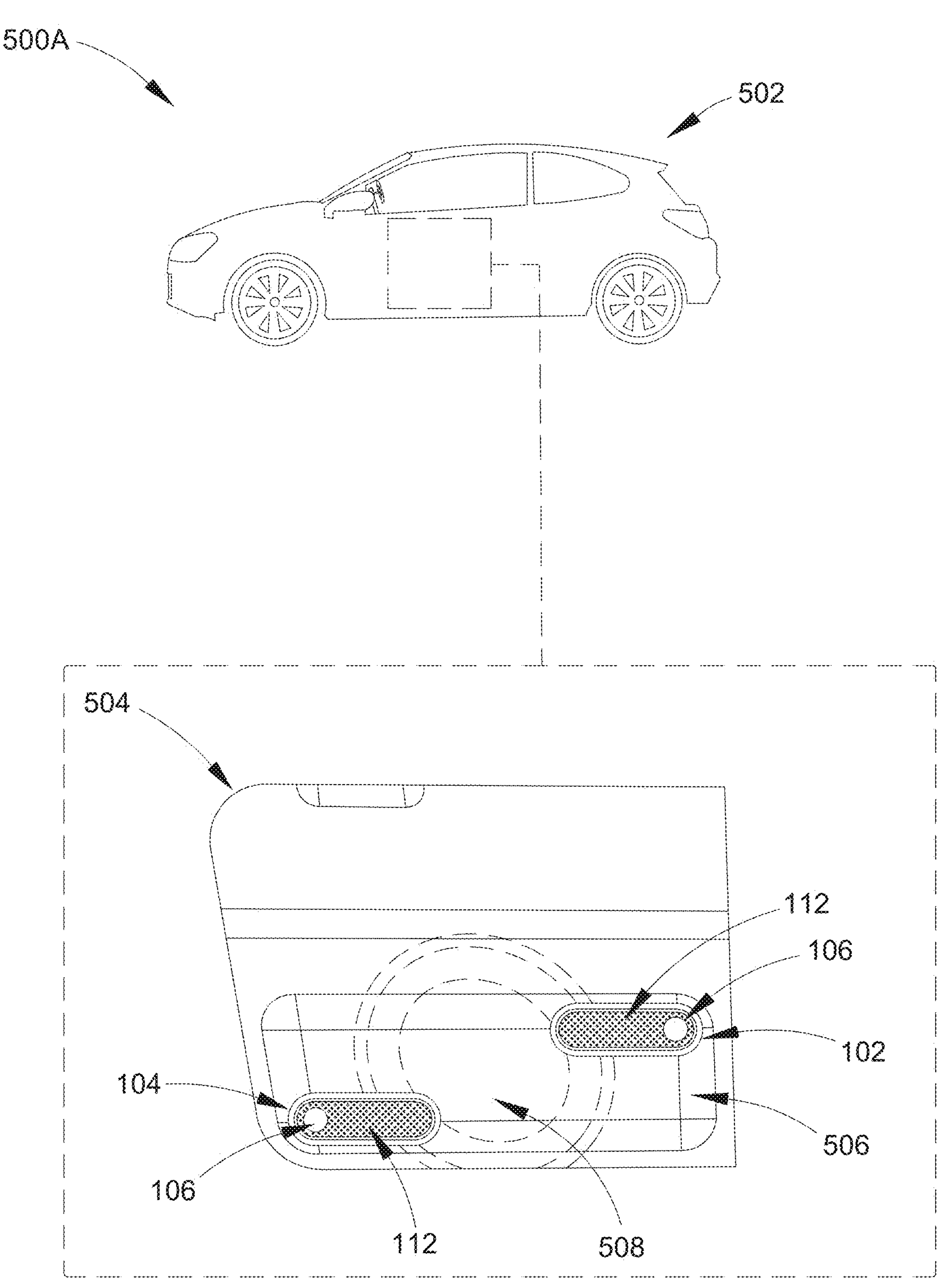
FIG. 5A is a scenario diagram that illustrates an exemplary implementation of the apparatus of FIG. 1A, in a detached state, in accordance with an embodiment of the disclosure.

FIG. 5A is a scenario diagram that illustrates an exemplary implementation of the apparatus of FIG. 1A, in a detached state, in accordance with an embodiment of the disclosure. With reference to the FIG. 5A, a scenario diagram 500A illustrates an implementation of the apparatus 100 in the detached state 120C. The scenario diagram 500A may include a vehicle 502, a support structure 504, a surface 506, and a cavity 508. It should be further noted that the scenario diagram 500A of FIG. 5A is for exemplary purposes and should not be construed to limit the scope of the disclosure.

The vehicle 502 may be a non-autonomous vehicle, a semi-autonomous vehicle, or a fully autonomous vehicle, for example, as defined by National Highway Traffic Safety Administration (NHTSA). Examples of the vehicle 502 may include, but are not limited to, a three-wheeler vehicle, a four-wheeler vehicle, a hybrid vehicle, or a vehicle with autonomous drive capability that uses one or more distinct renewable or non-renewable power sources. The vehicle may have an infotainment system for providing various safety and comfort features to a user. The infotainment system may include connectivity features, radio, multimedia, and navigation. The apparatus 100 may be communicatively connected to the infotainment system of the vehicle 502, via a wireless network (such as a Bluetooth®, a Wi-Fi® network, or a C-V2X network). It should be noted here that the vehicle 502 shown in FIG. 5A is a four-wheeler vehicle, which is merely an example. The present disclosure may be applicable to other types of vehicles (for example, trucks, buses, and the like). The description of such types of the vehicle 502 has been omitted from the disclosure for the sake of brevity.

The support structure 504 may be a structural member of the vehicle 502 that may be configured to bear stresses induced on the vehicle 502. Additionally, the support structure 504 may be a load-bearing framework of the vehicle 502, that may structurally support a plurality of vehicle systems. In accordance with an embodiment, the support structure 504 may be a door unit of the vehicle 502. Alternatively, the support structure 504 may be a pillar (e.g., A-pillar, B-pillar, etc.), a dashboard unit, a window or windshield, a seat, a foot space, or a bonnet of the vehicle 502.

The surface 506 may be an interior surface of a vehicle's cabin, such as a planar surface area or a curved surface area inside the vehicle's cabin. In an embodiment, the surface 506 may be at least one of an outside or inside surface of a door unit of the vehicle 502. However, the surface 506 may also be a surface of one of pillars, a dashboard, a window or windshield, a seat, a foot space, or a bonnet of the vehicle 502. Further, the surface 506 may have the cavity 508 that may be configured to amplify the sound generated from one of the first audio reproduction device 102 or the second audio reproduction device 104.

In the detached state 120C, at least one of the first audio reproduction device 102 or the second audio reproduction device 104 may be secured to the support structure 504. In an embodiment, at least one of the first interior surface 102A or the second interior surface 104A may be detachably attached or mounted to the surface 506 of the support structure 504 (such as a door unit of the vehicle 502). Additionally, or alternatively, the first interior surface 102A or the second interior surface 104A may be magnetically coupled to the surface 506 of the support structure 504 (such as a door unit of the vehicle 502), for example, via attaching component 106. Further, when the at least one of the first audio reproduction device 102 or the second audio reproduction device 104 is secured to the surface 506 of the support structure 504, each of the primary sound originating region 110 and the secondary sound originating region 112 may produce audio with less distortion. Moreover, the primary sound originating region 110 may face the surface 506 and the secondary sound originating region 112 may be exposed to ambient space inside the vehicle's cabin. In an operational state, the first audio reproduction device 102 or the second audio reproduction device 104 may generate audio that may be amplified due to the cavity 508 in the support structure 504. For example, the audio generated from at least one of the primary sound originating region 110 or the secondary sound originating region 112 may strike a surface of the cavity 508 and bounce back, amplifying the audio.

Figure 5B:
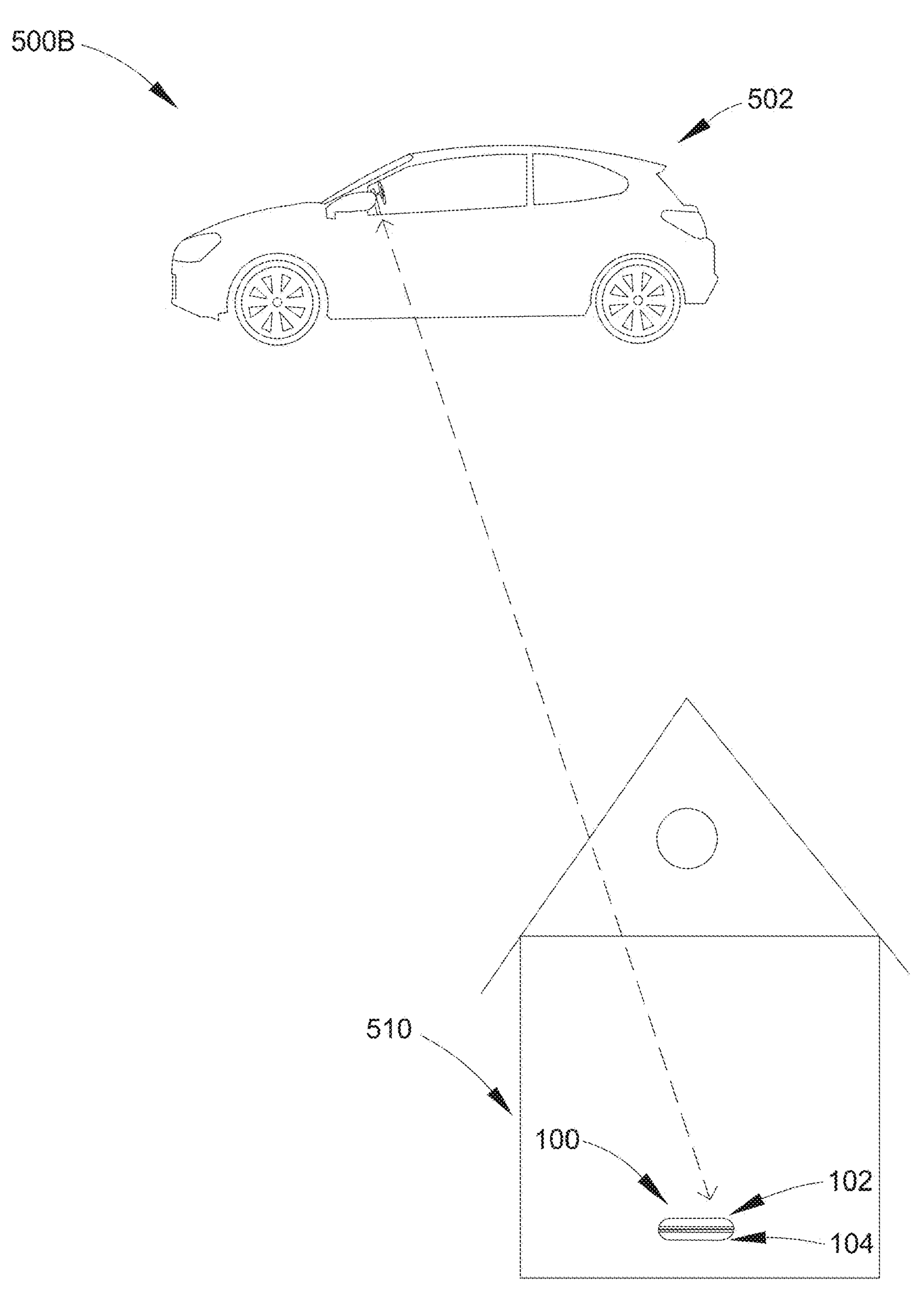
FIG. 5B is a scenario diagram that illustrates an exemplary implementation of the apparatus of FIG. 1A, in a closed state, in accordance with an embodiment of the disclosure.

FIG. 5B is a scenario diagram that illustrates an exemplary implementation of the apparatus of FIG. 1A, in a closed state, in accordance with an embodiment of the disclosure. With reference to the FIG. 5B, a scenario diagram 500B illustrates an implementation of the apparatus 100 in the closed state 120A. The scenario diagram 500B may include an environment 510. In an example, the environment 510 may be an enclosed space, such as a building or tent. The apparatus 100 may be placed inside the environment 510, as shown in FIG. 5B, for example. Further, the apparatus 100 placed inside the environment 510 may be wirelessly connected with the vehicle 502 or other electronic device. It should be further noted that the scenario diagram 500B of FIG. 5B is for exemplary purposes and should not be construed to limit the scope of the disclosure.

In the closed state 120A, the first audio reproduction device 102 and the second audio reproduction device 104 may be, for example, magnetically attached or snapped together. In the closed state 120A, the secondary sound originating region 112 of the first exterior surface 102B or the second exterior surface 104B may be exposed to an open space or environment, such as the environment 510. In the operational state, the secondary sound originating region 112 of the first audio reproduction device 102 or the second audio reproduction device 104 may generate audio. In an embodiment, the apparatus 100 may be wirelessly connected to a display device of the vehicle 502, media device, or other electronic device while the apparatus is placed in the environment 510.

Figure 6A:
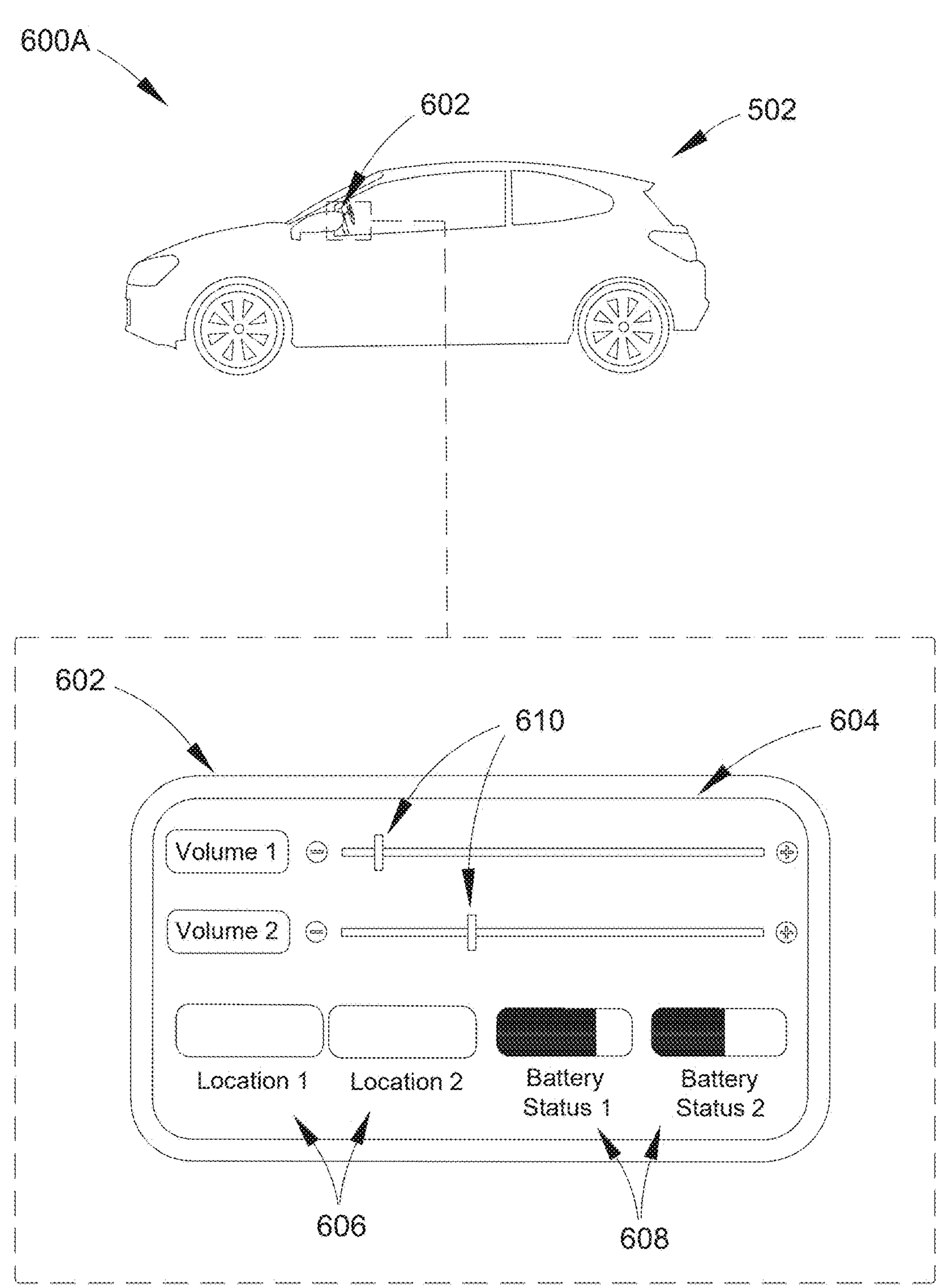
FIG. 6A is a diagram that illustrates an exemplary display device communicatively coupled to the apparatus of FIG. 1A, in accordance with an embodiment of the disclosure.

FIG. 6A is a diagram that illustrates an exemplary display device communicatively coupled to the apparatus of FIG. 1A, in accordance with an embodiment of the disclosure. With reference to the FIG. 6A, a diagram 600A illustrates a display device 602 with a graphical user interface (GUI) 604, which may include location tabs 606, a battery status tab 608, and a changeable UI element 610. The display device 602 may be communicatively coupled with each of the first audio reproduction device 102 and the second audio reproduction device 104. It should be noted that the diagram 600A as shown in FIG. 6A is for exemplary purposes and should not be construed to limit the scope of the disclosure.

The display device 602 may include suitable logic, circuitry, and interfaces that may be configured to display information associated with the apparatus 100 and the vehicle 502. The display device 602 may be realized through several known technologies, such as but not limited to, a Liquid Crystal Display (LCD) display, a Light Emitting Diode (LED) display, a plasma display, or an Organic LED (OLED) display technology. In accordance with an embodiment, the display device 602 may refer to a display screen of a head mounted device (HMD), a smart-glass device, a see-through display, a projection-based display, an electrochromic display, or a transparent display. Further, each of the first audio reproduction device 102 and the second audio reproduction device 104 may be configured to control the display device 602.

In accordance with an embodiment, the display device 602 may include the GUI 604, which may be configured to render a location of the first audio reproduction device 102 or the second audio reproduction device 104. Further, the GUI 604 may render information regarding a battery status of each of the first audio reproduction device 102 and the second audio reproduction device 104. The GUI 604 may also include the changeable UI element 610.

The GUI 604 may include location tabs 606 that may be configured to render a location of at least one of the first audio reproduction device 102 or the second audio reproduction device 104. The location of the first audio reproduction device 102 may be detected as a relative location with respect to a reference location in an ambient environment surrounding the apparatus 100. The detection may be performed based on a location estimation method and the location may be rendered on the location tabs 606. The location estimation method may rely on a location sensor (such as a Global Navigation Satellite System (GNSS) sensor, a camera, or a user device) or a signal-based triangulation method to detect the location. Similarly, the location of the second audio reproduction device 104 may be detected.

The changeable UI element 610 may be configured to adjust a sound setting such as a sound volume, based on a location of the first audio reproduction device 102 or the second audio reproduction device 104. For example, a length of the changeable UI element 610 may represent a range of values for the sound setting, such as a sound volume associated with each of the first audio reproduction device 102 or the second audio reproduction device 104, and movement of a slider of the UI element 610 along the length may adjust the sound setting. In an exemplary embodiment, changeable UI element 610 may correspond to one of a minimum value and maximum value. In an example, if the first audio reproduction device 102 is located on a right door unit of the vehicle 502 and the second audio reproduction device 104 is located on a left door unit of the vehicle 502, then a user may move the changeable UI element 610 to adjust a sound setting of at least one of the first audio reproduction device 102 or the second audio reproduction device 104. In another example, if the first audio reproduction device 102 is located on a roof a room and the second audio reproduction device 104 is located on a wall of the room, then a user may move the slider UI element 610 to adjust a sound setting of at least one of the first audio reproduction device 102 or the second audio reproduction device 104. By way of example, and not limitation, the user may move the changeable UI element 610 either manually or via a wireless network (such as a Bluetooth®, a Wi-Fi® network, or a V2X network).

The GUI 604 may include the battery status tabs 608 that may be configured to render the battery status of each of the first audio reproduction device 102 and the second audio reproduction device 104. Based on the battery status of each of the first audio reproduction device 102 and the second audio reproduction device 104, the display device 602 may display a prompt overlay 612, as described in detail, for example, in FIG. 6B.

Figure 6B:
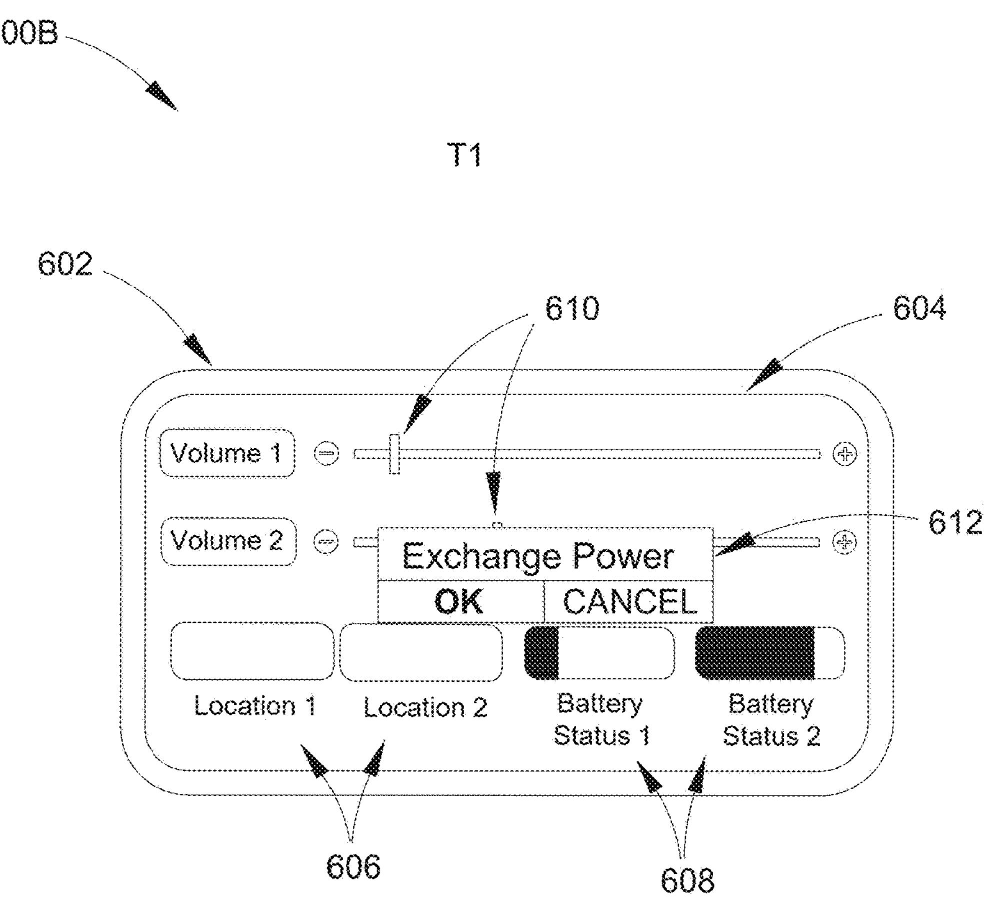
FIG. 6B is a scenario diagram that illustrates an exemplary implementation of a display device of FIG. 6A, in accordance with an embodiment of the disclosure.
Figure 6B:
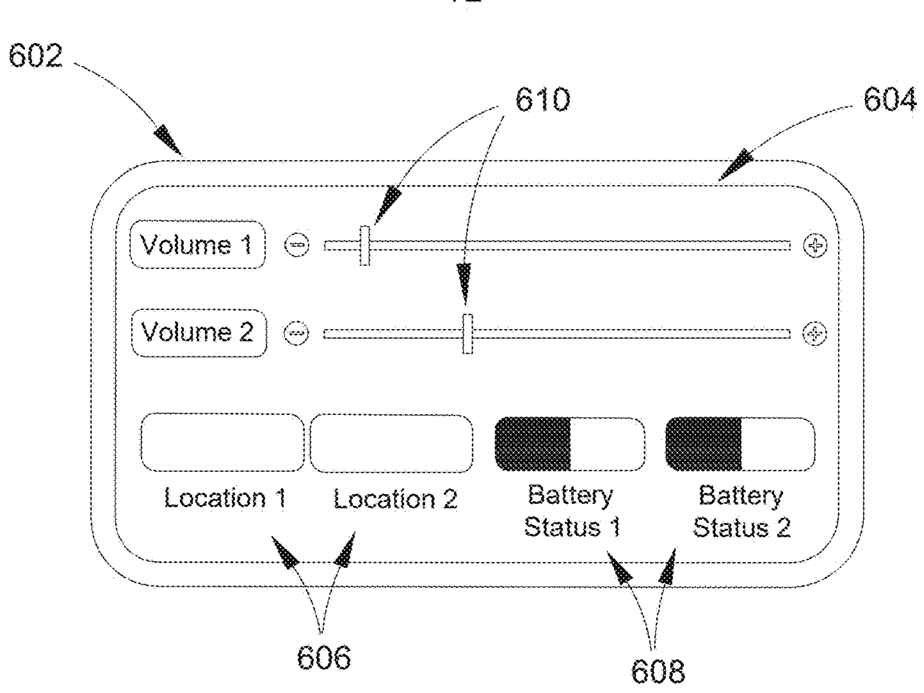

FIG. 6B is a scenario diagram that illustrates an exemplary implementation of a display device of FIG. 6A, in accordance with an embodiment of the disclosure. With reference to the FIG. 6B, a scenario diagram 600B illustrates the display device 602 at a time instant T1, the display device 602 at a time instant T2, and a prompt overlay 612. It should be noted that the scenario diagram 600B as shown in FIG. 6B is for exemplary purposes and should not be construed to limit the scope of the disclosure.

At time instant T1, the GUI 604 may render the battery status of each of the first audio reproduction device 102 or the second audio reproduction device 104 in the battery status tabs 608. For example, the battery status of the first audio reproduction device 102 may be in a range of 20-30 percent as rendered in the battery status tabs 608 (referred to as "battery status 1"). As another example, the battery status of the second audio reproduction device 104 may be in a range of 70-80 percent as rendered in the battery status tabs 608 (referred to as "battery status 2"). In accordance with an embodiment, the GUI 604 may render the prompt overlay 612 with an option to exchange power between the first audio reproduction device 102 and the second audio reproduction device 104. Based on the selection of the option to exchange power, the power may be exchanged between the first audio reproduction device 102 and the second audio reproduction device 104 via a wireless or a wired charging interface included in the apparatus 100.

At time instant T2, after the exchange of the power, the GUI 605 may render an updated battery status of each of the first audio reproduction device 102 and the second audio reproduction device 104 in the battery status tabs 608. For example, after the exchange, both the audio reproduction devices may be in a range of 45-55 percent (as rendered in the battery status tabs 608). The prompt overlay 612 may disappear after the option to exchange power is selected or after the exchange of power between the first audio reproduction device 102 and the second audio reproduction device 104 is completed. The prompt overlay 612 may also disappear when a user cancels the exchange of power between the first audio reproduction device 102 and the second audio reproduction device 104.

Figure 7:
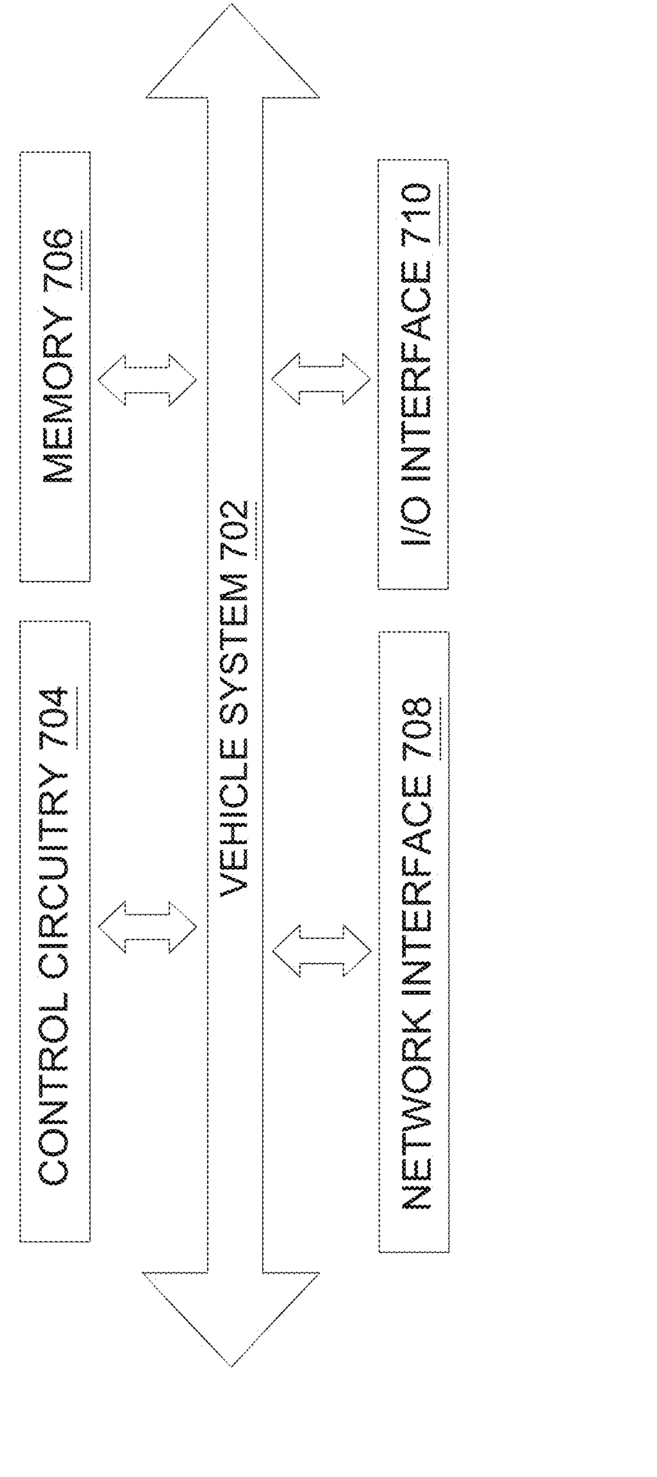
FIG. 7 is a block diagram that illustrates an exemplary vehicle system of the vehicle of FIG. 5A, in accordance with an embodiment of the disclosure.

FIG. 7 is a block diagram that illustrates an exemplary vehicle system of the vehicle of FIG. 5A, in accordance with an embodiment of the disclosure. With reference to the FIG. 7, there is shown a block diagram 700 of the vehicle 502 that includes a vehicle system 702, a control circuitry 704, a memory 706, a network interface 708, and an I/O interface 710. The vehicle 502 may include the vehicle system 702 such as, but not limited to, an electric system communicatively connected to the apparatus 100 and another electronic devices (such as the display device 602 or GUI 604), via the network interface 708. It should be noted that the block diagram 700 as shown in FIG. 7 is for exemplary purposes and should not be construed to limit the scope of the disclosure.

The control circuitry 704 may include suitable logic, circuitry, and/or interfaces code that may be configured to execute program instructions associated with different operations to be executed by the vehicle system 702. The control circuitry 704 may include one or more specialized processing units. In an embodiment, such specialized processing units may be implemented as an integrated processor or a cluster of processors that perform the functions of the one or more specialized processing units, collectively. For example, the control circuitry 704 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or process data. Examples of the control circuitry 704 may include a Central Processing Unit (CPU), a Graphical Processing Unit (GPU), an x86-based processor, an x64-based processor, a Reduced Instruction Set Computing (RISC) processor, a Complex Instruction Set Computing (CISC) processor, and/or other hardware processors.

The memory 706 may include suitable logic, circuitry, interfaces, and/or code that may be configured to store the program instructions executable by the control circuitry 704. In at least one embodiment, the memory 706 may be configured to store information regarding location, battery status, and sound settings of each of the first audio reproduction device 102 and the second audio reproduction device 104. The memory 706 may be a persistent storage medium, a non-persistent storage medium, or a combination thereof. Example implementations of the memory 706 may include, but are not limited to, Random Access Memory (RAM), Read Only Memory (ROM), Hard Disk Drive (HDD), a Solid-State Drive (SSD), a CPU cache, and/or a Secure Digital (SD) card.

The network interface 708 may include suitable logic, circuitry, and interfaces that may be configured to facilitate communication between the vehicle system 702 that is communicatively connected to the apparatus 100 and another electronic devices (such as the display device 602 or GUI 604). The network interface 708 may be implemented by use of various known technologies to support wired or wireless communication of the vehicle system 702 to connect the apparatus 100 and another electronic devices (such as the display device 602 or GUI 604) in the communication network. The network interface 808 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 808 may be configured to communicate via wireless communication with networks, such a Bluetooth®, a Wi-Fi® network, or a C-V2X network. The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi), voice over Internet Protocol (VoIP), light fidelity (Li-Fi), Worldwide Interoperability for Microwave Access (Wi-MAX), a protocol for email, instant messaging, and a Short Message Service (SMS).

The I/O interface 710 may include suitable logic, circuitry, and interfaces that may be configured to receive an input (from a user) and provide an output based on the received input. The I/O interface 710 may include various input and output devices, may be configured to communicate with the control circuitry 704 and the vehicle system 702. Examples of the I/O interface 710 may include, but are not limited to, the display device 602, the GUI 604, a keyboard, a mouse, a joystick, a microphone, a computing device, and a speaker.

FIG. 8 is a flowchart that illustrates an exemplary method of assembly of an apparatus, in accordance with an embodiment of the disclosure. With reference to the FIG. 8, there is shown a flowchart 800, which may depict a method of assembly and operation for the apparatus 100. The method illustrated in the flowchart 800 may start at 802 and proceed to 804.

At 804, the attaching component 106 may be located at the attaching portion 108 of at least one of the first audio reproduction device 102 or the second audio reproduction device 104, such that the swivel joint 304 may be formed between the first interior surface 102A of the first audio reproduction device 102 and the second interior surface 104A of the second audio reproduction device 104. Further details regarding locating the attaching component 106 and the attaching portion 108, is described in detail, for example, in FIGS. 1A-1C, 3, and 4.

At 806, the second interior surface 104A of the second audio reproduction device 104 may be removably attached with the first interior surface 102A of the first audio reproduction device 102, in the closed state 120A, via the attaching component 106, as described in detail, for example, in FIGS. 1A-1C and 5A-5B.

At 808, the force 306 on the exterior surface of the first audio reproduction device 102 or exterior surface of the second audio reproduction device 104 may be applied that may cause the first interior surface 102A to swivel apart from the second interior surface 104A about the swivel joint 304, as described in detail, for example, in FIGS. 1A-1B, 3, and 4. The first audio reproduction device 102 and the second audio reproduction device 104 may also be detached and separated from each other, as described in detail, for example, in FIGS. 1A-1C and 5A.

At 810, the at least one of the first audio reproduction device 102 or the second audio reproduction device 104 may be secured to the support structure 504 such that the first interior surface 102A and the second interior surface 104A may be detachably coupled to the surface 506 of the support structure 404. Further, the first audio reproduction device 102 or the second audio reproduction device 104, in an operation state, may generate audio that may be amplified due to the cavity 508 in the support structure 504, as described in detail, for example, in FIG. 1A-1C and 5A.

Although the flowchart 800 is illustrated as discrete operations, such as 802, 804, 806, 808, and 810 the disclosure is not so limited. Accordingly, in certain embodiments, such discrete operations may be further divided into additional operations, combined into fewer operations, or eliminated, depending on the particular implementation without detracting from the essence of the disclosed embodiments.

For the purposes of the present disclosure, expressions such as "including", "comprising", "incorporating", "consisting of", "have", "is" used to describe, and claim the present disclosure are intended to be construed in a non-exclusive manner, namely allowing for items, components or elements not explicitly described also, to be present. Reference to the singular is also to be construed to relate to the plural. Further, all joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

The foregoing description of embodiments and examples has been presented for purposes of illustration and description. It is not intended to be exhaustive or limiting to the forms described. Numerous modifications are possible considering the above teachings. Some of those modifications have been discussed and others will be understood by those skilled in the art. The embodiments were chosen and described for illustration of various embodiments. The scope is, of course, not limited to the examples or embodiments set forth herein but can be employed in any number of applications and equivalent devices by those of ordinary skill in the art. Rather it is hereby intended the scope be defined by the claims appended hereto. Additionally, the features of various implementing embodiments may be combined to form further embodiments.

What is claimed is:

1. An apparatus, comprising:

a first audio reproduction device having a first interior surface;

a second audio reproduction device having a second interior surface; and an attaching component configured to removably attach the first interior surface with the second audio reproduction device, wherein the attaching component is located at an attaching portion of at least one of the first audio reproduction device or the second audio reproduction device such that a swivel joint is formed between the first interior surface and the second interior surface, wherein, in a detached state, the first audio reproduction device is detached from the second audio reproduction device.

2. The apparatus according to claim 1, wherein each of the first audio reproduction device or the second audio reproduction device are wirelessly connected to each other.

3. The apparatus according to claim 1, wherein each of the first interior surface and the second interior surface include a primary sound originating region that is located in at least one of a partial region or an entire region of the first interior surface and the second interior surface.

4. The apparatus according to claim 1, wherein the first interior surface is flushed to the second interior surface in the closed state.

5. The apparatus according to claim 1, wherein, in the closed state, a contact area between the first interior surface and the second interior surface is greater than a surface area of other flat or substantially flat surfaces of the first audio reproduction device or the second audio reproduction device.

6. The apparatus according to claim 1, wherein an application of a force on the first audio reproduction device or the second audio reproduction device causes the first interior surface to swivel apart from the second interior surface about the swivel joint.

7. The apparatus according to claim 1, wherein at least one of the first audio reproduction device or the second audio reproduction device is secured to a support structure such that the first interior surface or the second interior surface is detachably coupled to a surface of the support structure, and wherein the first audio reproduction device or the second audio reproduction device, in an operational state, generates audio that is amplified due to a cavity in the support structure.

8. The apparatus according to claim 7, wherein the support structure is at least one of a door unit, a pillar, a dashboard unit, a window or windshield, a seat, a foot space, or a bonnet of a vehicle; and the surface corresponds to an interior surface of a vehicle's cabin.

9. The apparatus according to claim 1, wherein the attaching component is one of a magnet or an electromagnetic magnet, and the attaching component is configured to flush the first interior surface in a direct contact with the second interior surface.

10. The apparatus according to claim 1, wherein the first audio reproduction device includes a first exterior surface that is opposite to the first interior surface, and the second audio reproduction device includes a second exterior surface that is opposite to the second interior surface.

11. The apparatus according to claim 10, wherein each of the first exterior surface and the second exterior surface includes a secondary sound originating region that is located in at least one of a partial region or an entire region of the first exterior surface and the second exterior surface.

12. The apparatus according to claim 1, wherein each of the first audio reproduction device and the second audio reproduction device is communicatively coupled to a display device, and each of the first audio reproduction device and the second audio reproduction device is configured to control the display device to:

render, on a graphical user interface (GUI), a location of the first audio reproduction device or the second audio reproduction device, and a battery status of each of the first audio reproduction device and the second audio reproduction device on the GUI.

13. The apparatus according to claim 12, wherein GUI further comprises a changeable UI element, and a movement of the changeable UI element is configured to adjust a sound setting, based on the location of the first audio reproduction device or the second audio reproduction device.

14. The apparatus according to claim 12, wherein GUI further comprises a prompt overlay with an option to exchange power between the first audio reproduction device and the second audio reproduction device, based on the battery status of each of the first audio reproduction device and the second audio reproduction device.

15. A method of assembly an apparatus, comprising:

locating an attaching component at an attaching portion of at least one of a first audio reproduction device or a second audio reproduction device, such that a swivel joint is formed between a first interior surface of the first audio reproduction device and a second interior surface of the second audio reproduction device;

removably attaching the second interior surface of the second audio reproduction device with the first interior surface of the first audio reproduction device, in a closed state, via the attaching component;

applying a force on the first audio reproduction device or the second audio reproduction device causes the first interior surface to swivel apart from the second interior surface about the swivel joint; and securing at least one of the first audio reproduction device or the second audio reproduction device to a support structure such that the first interior surface or the second interior surface is detachably coupled to a surface of the support structure, wherein, the first audio reproduction device or the second audio reproduction device, in an operational state, generates audio that is amplified due to a cavity in the support structure.

16. The method according to claim 15, wherein each of the first interior surface and the second interior surface include a primary sound originating region that is located in at least one of a partial region or an entire region of the first interior surface and the second interior surface.

17. The method according to claim 15, wherein, in the closed state, a contact area between the first interior surface and the second interior surface is greater than a surface area of other flat or substantially flat surfaces of the first audio reproduction device or the second audio reproduction device.

18. The method according to claim 15, wherein the method further comprises:

communicatively coupling, a display device to each of the first audio reproduction device and the second audio reproduction device, and controlling, the display device using one of the first audio reproduction device and the second audio reproduction device, wherein controlling includes:

rendering, on a graphical user interface (GUI), a location of the first audio reproduction device or the second audio reproduction device, and a battery status of each of the first audio reproduction device and the second audio reproduction device on the GUI.

19. The method according to claim 18, wherein GUI further comprises a prompt overlay with an option to exchange power between the first audio reproduction device and the second audio reproduction device, based on the battery status of each of the first audio reproduction device and the second audio reproduction device.

20. An apparatus, comprising:

a first audio reproduction device having a first interior surface;

a second audio reproduction device having a second interior surface, wherein the first audio reproduction device and the second audio reproduction device are wirelessly connected to each other; and an attaching component configured to removably attach the first interior surface with the second interior surface, wherein the attaching component is located at an attaching portion of at least one of the first audio reproduction device or the second audio reproduction device such that a swivel joint is formed between the first interior surface and the second interior surface.

* * * * *